July 22, 1958  H. E. JOHNS ET AL  2,844,736
COLLIMATOR FOR HIGH ENERGY X-RAY BEAM
Filed May 18, 1954  6 Sheets-Sheet 1

INVENTORS.
HAROLD E. JOHNS
JOHN A. MACKAY
BY
Hyde, Meyer, Baldwin & Doran
ATTORNEYS July 22, 1958  H. E. JOHNS ET AL  2,844,736
COLLIMATOR FOR HIGH ENERGY X-RAY BEAM Filed May 18, 1954  6 Sheets-Sheet 2

INVENTORS.
HAROLD E. JOHNS
JOHN A. MACKAY
BY
ATTORNEYS

July 22, 1958 H. E. JOHNS ET AL 2,844,736
COLLIMATOR FOR HIGH ENERGY X-RAY BEAM
Filed May 18, 1954 6 Sheets-Sheet 3

INVENTORS.
HAROLD E. JOHNS
JOHN A. MACKAY
BY
Kyle, Meyer, Baldwin & Doran
ATTORNEYS July 22, 1958 H. E. JOHNS ET AL 2,844,736
COLLIMATOR FOR HIGH ENERGY X-RAY BEAM
Filed May 18, 1954 6 Sheets-Sheet 5

INVENTORS.
HAROLD E. JOHNS
JOHN A. MACKAY
BY
Hyde, Meyer, Baldwin & Doran
ATTORNEYS

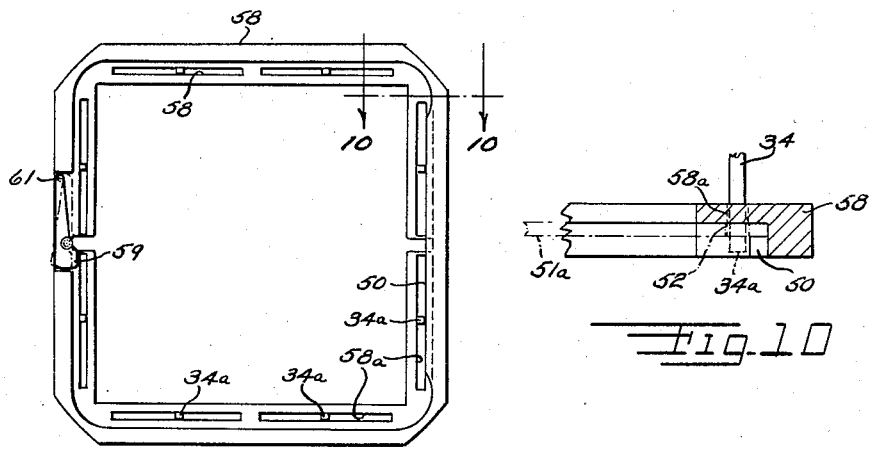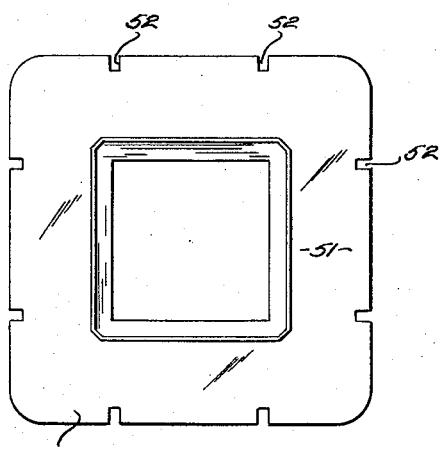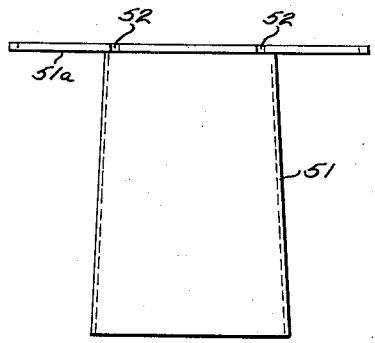

United States Patent Office 2,844,736
Patented July 22, 1958

2,844,736

COLLIMATOR FOR HIGH ENERGY X-RAY BEAM

Harold E. Johns and John A. MacKay, Saskatoon, Saskatchewan, Canada, assignors to Picker X-Ray Corporation Waite Manufacturing Division, Inc., Cleveland, Ohio, a corporation of Ohio Application May 18, 1954, Serial No. 430,584

22 Claims. (Cl. 250—105)

This invention relates to improvements in a collimator for high energy rays emanating from a source, and is directed specifically to the control of rays from sources equivalent to about 1000 to 1500 curies of radium, or stronger.

An object of the present invention is to provide means for controlling high energy rays of the type described by the use of a plurality of ray absorbing diaphragms movably mounted in a housing and arranged progressively from the source outwardly with control means for holding the inner edges of the diaphragms nearest the rays in progressively diverging relation as one moves away from the source.

A more specific object of the present invention is the provision of first and second sets of diaphragm bars movably mounted in a housing, each set comprising pairs of bars lying one along each side of the opposite parallel sides of a rectangle, alternate sets of these bars lying at right angles to each other, and each said pair of bars lying generally in the same plane.

A further object of the present invention is to provide first and second sets of fixed bars cooperating with said movable diaphragm bars mentioned in the preceding paragraph to stop undesirable scattering of the high energy rays outside of the controlled beam and to help attenuate primary radiation, especially with large fields. Preferably, these fixed bars are secured in a housing with each set comprising pairs of fixed bars lying one of each pair along the opposite parallel sides of a rectangle, one of these sets of bars lying at right angles to the other set, each pair of fixed bars lying generally in the same plane and preferably supporting a pair of diaphragm bars movable in the same plane and extending at right angles to the fixed bars upon which they are supported.

This invention also provides control means for holding the inner edges of a plurality of diaphragm bars substantially aligned along the slanting sides of an imaginary cone whose apex is approximately at the source of high energy rays in all of the adjusted positions of the diaphragm bars.

The invention also contemplates the use of an other-than-point source of the high energy rays with control means holding a series of movable diaphragm bars in various adjusted positions, and in each of these positions, the inner edges of these diaphragms are substantially aligned along the slanting sides of an imaginary cone, the sides of which extend approximately through the lateral edges of the source.

This invention also teaches the arrangement of the diaphragm bars, and preferably also the fixed bars, as varying in lateral width and decreasing in width progressively along the beam of rays as one moves away from the source so as to provide a very compact but efficient collimator.

Other objects of the present invention include the combination of a fixed primary aperture limiting the maximum size of the cone of radiation controlled by an adjustable aperture of our improved construction; novel means for supporting the diaphragm bars for lateral movement; improved means for connecting the diaphragm bars together for coordinated movement along the cone of adjustment; novel means for adjusting opposite pairs of bars toward and away from each other; provision for the rotation of the adjustable aperture collimator with respect to a fixed head enclosing the source; encasing the diaphragm bars with a layer of scattered-radiation-minimizing material on all sides of said bars if desired; the specific profile of the inner edges of the diaphragm bars nearest the beam of rays; the provision of additional ray-absorbing material at those locations in the collimator where the protection is otherwise at a minimum; provision for the use of compression applicators at the end of the collimator and suitable interlocks with the adjustable parts of the collimator to insure the use of the proper compression applicator at all times; and other refinements of the invention as will more clearly appear in the accompanying drawings and description.

In the drawings—

Fig. 9 is a bottom plan view of the hollow square plate or collar 58 of Figs. 4 and 5;

Fig. 10 is a section view taken along the line 10—10 of Fig. 9; while

Figs. 11 and 12 are top plan and side elevational views, respectively of a compression applicator for use with the collimator.

The use of high energy rays in medicine, industry and research has posed problems for the control of these rays where a directed beam of the rays is required. The present invention is directed to this problem. Wherever in the specification and claims the term "high energy rays" is used, or the equivalent, it is intended to include X-rays in the two to three million volt region, or cobalt[60] gamma rays or rays of a similar character or more penetrating than that. The present invention is described in connection with the use of a cobalt[60] source.

The invention will be described with respect to the use of these rays from a therapeutic point of view, treating human beings, although it will be understood that the invention is useful for controlling high energy rays for any use whatever.

Figure 1:
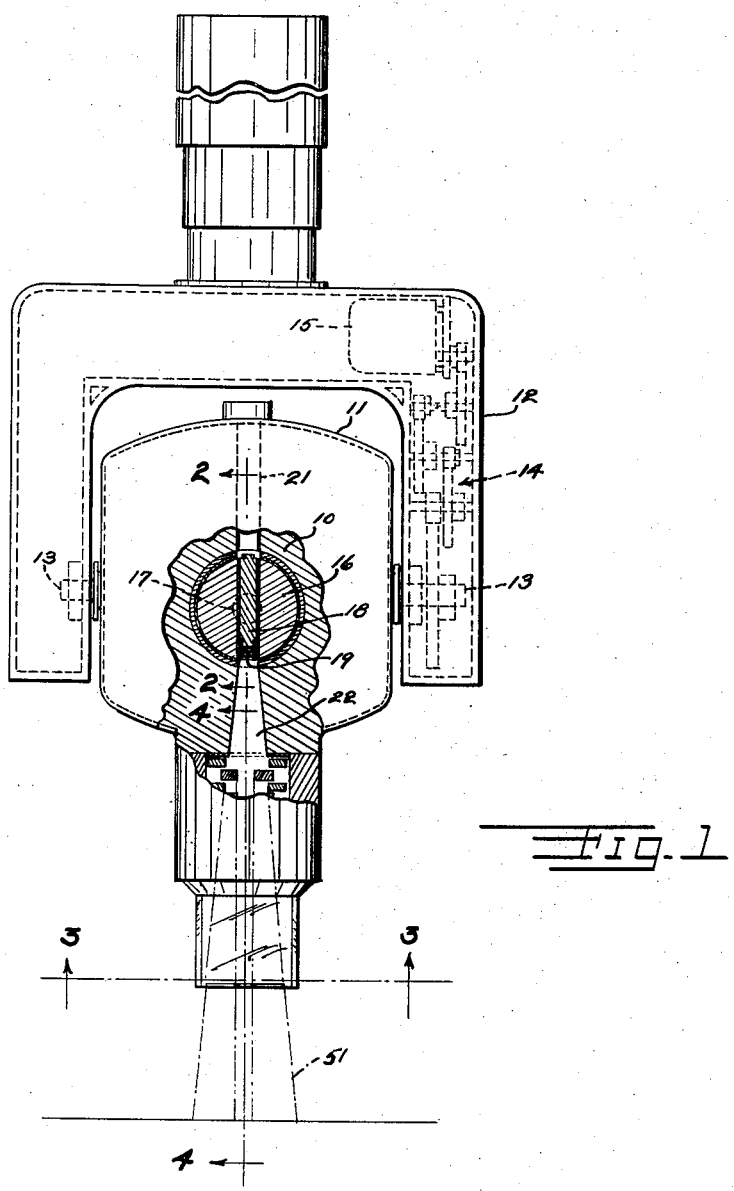
Fig. 1 is a plan view of a tube stand supporting a head in which a high energy source is mounted and equipped with our improved collimator, parts of the head being broken away in section to more clearly show the construction.
Figure 2:
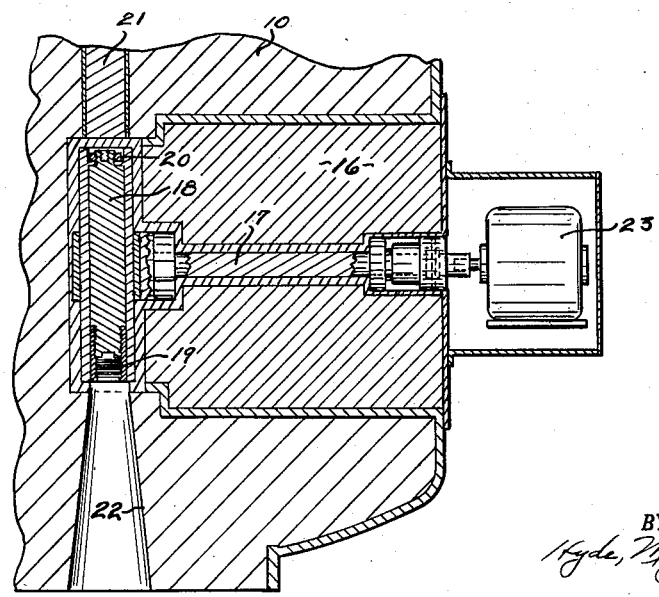
Fig. 2 is a fragmental sectional view, enlarged, taken along the line 2—2 of Fig. 1.

The mounting and control of the source forms no part of the present invention except insofar as it provides a fixed primary aperture in combination with the adjustable secondary aperture of the present invention. Briefly, a cylinder of lead, tungsten alloy or other heavy metal 10 is completely encased in steel indicated at 11, providing a unit approximately 20 inches in diameter, 22 inches high with rounded ends and weighing about one ton. This unit is mounted for rotation in a yoke 12 on trunnions 13. Connected with one of the trunnions is a gear train 14 driven by an electric motor 15 for the purpose of controlling the source holding unit. At the center of this head or unit, there is placed a steel-encased lead-filled wheel 16 which is mounted by means of a central shaft 17 for rotation about an axis perpendicular to the plane of the paper in Fig. 1. One diameter of this wheel is made of a rectangular bar 18 of heavy metal approximately 1½ inches square by 7 inches long. In one end of the bar 18 are mounted a plurality of disks 19 of cobalt[60]. The bar 18 is held in position in the wheel 16 by means of a nut 20 on the upper end. A lead plug 21 is provided through the upper portion of the head 10 opposite the upper end of the bar 18 and this plug is removable for manipulation of the bar 18 in inserting or removing the source from the head. Opposite the lower end of the bar 18, when the source is in operating position, is a conical aperture 22 diverging away from the source and providing a fixed primary aperture which limits the maximum size of the cone of radiation controlled by the adjustable aperture. The parts are shown in Figs. 1 and 2 with the bar 18 placing the source in position for use or in the "on" position. To turn the unit "off," the wheel 16 is turned until the bar 18 is 180 degrees from the position shown in Fig. 1. This is accomplished by a small two phase electrical motor 23 connected to the shaft 17 as shown in Fig. 2.

The diameter of the cobalt disks 19 is a matter of compromise. In the machine herein described, these disks are approximately 1 inch in diameter and the cobalt[60] has a specific activity of about 25 curies per gram. Another unit utilized disks of approximately 11/32 inches diameter where the specific activity was of the order 125 curies per gram. In the final analysis it is a question of balancing the disadvantages of a large source with the economic advantages of low specific activity source. A source between 1 centimeter to 3 centimeters in diameter seems to be a suitable compromise with these two considerations in mind. This is the basis for the use of the phrase "other-than-point source" hereinafter.

Figure 3:
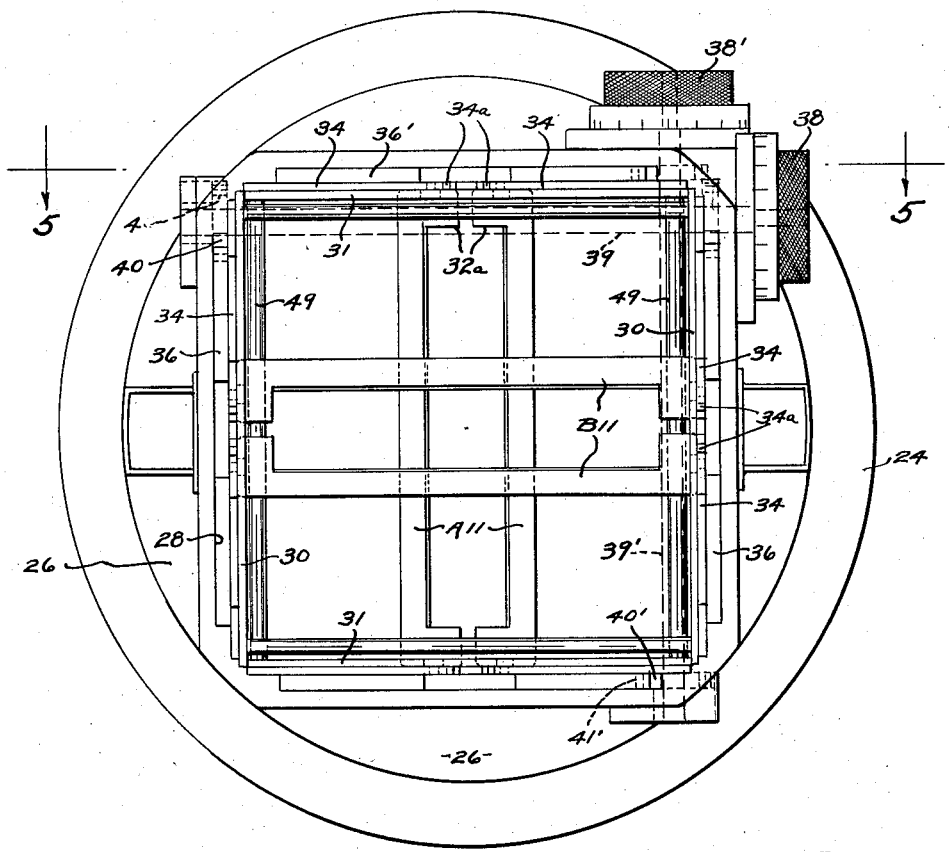
Fig. 3 is a fragmental bottom plan view, enlarged, taken along the line 3—3 of Fig. 1 with the bottom retaining ring omitted to more clearly show the parts.

Proceeding now to the description of the adjustable aperture, a fixed means or outer housing 24 of any suitable material, but preferably steel or iron, is secured to a plate 25 which is attached to the steel casing 11 of the head around the aperture 22. Rotatably mounted in the member 24 is the inner housing 26 which may be mounted on ball bearings as indicated at 27. Obviously, the mating surfaces of members 24 and 26 are cylindrical. An approximately square opening 28 is provided as shown in Fig. 3 extending axially of the housing 26. A first set of fixed bars 29a are mounted in fixed position in the housing 26 by means of the straps 30. This set comprises a plurality of pairs of bars, the bars of each pair lying along opposite parallel sides of a rectangle. The two bars of each pair lie in a common plane and the pairs of bars 29a are spaced from each other along the entire length of the collimator. A second set of fixed bars 29b are arranged at right angles to the bars 29a and lie along the other two opposite sides of the rectangle. It will be noted in Fig. 1 that the bars 29b are spaced apart and interspaced between the sets of bars 29a. The bars 29b of a pair are held in spaced parallel position by straps 31 fixed to opposite ends of the pair. The fixed bars 29a and 29b are preferably of steel or similar material for strength.

The movable diaphragm bars, indicated from A1 to A11 inclusive comprise a first set of these bars arranged in a plurality of spaced pairs lying one along each side of the opposite parallel sides of a rectangle, each of these pairs of bars lying generally in the same plane and here shown in the same plane with the sets of fixed bars 29a. A second set of diaphragm bars here indicated from B1 to B11 inclusive lie in pairs one along each side of the parallel sides of a rectangle at right angles to the bars A1, A2, etc. Each pair of bars B1, B2, etc. lie in the same plane and are here shown in the same plane with a pair of fixed bars 29b.

A pair of bars A1 together with a pair of bars B1 furnish what we have designated in the claims as a "layer" of diaphragms, and the present invention discloses eleven such layers from A1–B1 to A11–B11.

After the fixed bars 29a and 29b, and the diaphragm bars A1, A2, etc. and B1, B2, etc. have been assembled in the housing 26, together with tie plates 34 and cam plates 36, a hollow square plate 58 is secured to the lower end of housing 26 by screws (not shown) to hold all these parts in place. Slots 58a receive and guide the ends 34a of plates 34.

Figure 4:
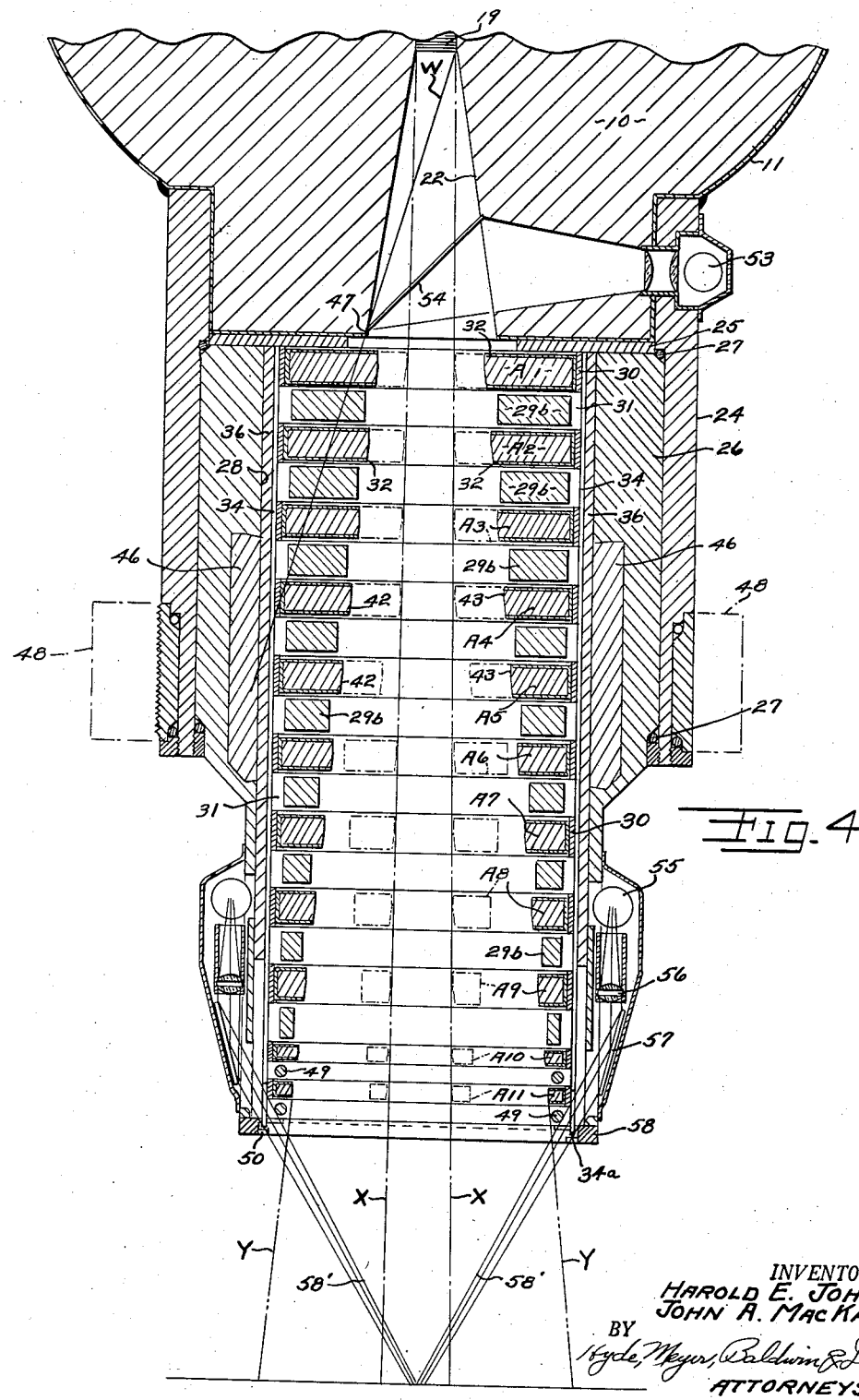
Fig. 4 is a fragmental sectional view, enlarged, taken along the line 4—4 of Fig. 1.
Figure 6:
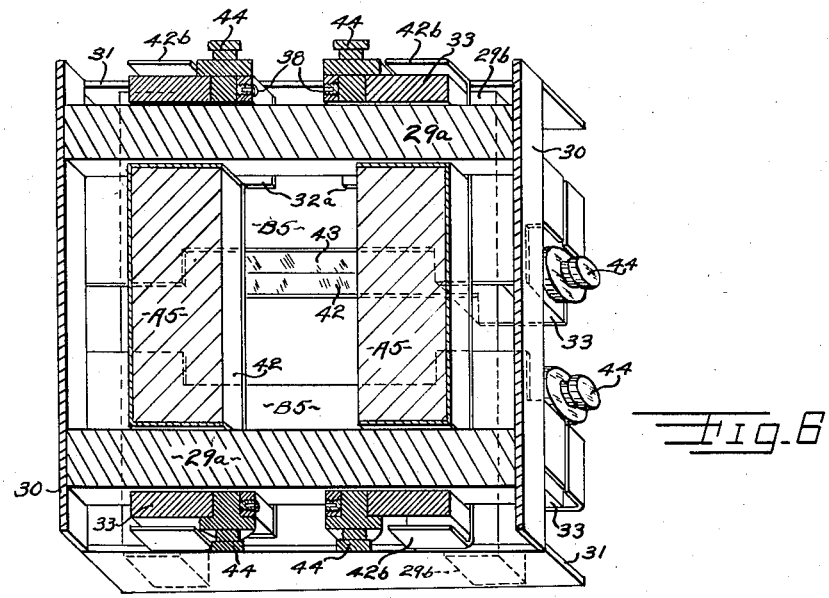
Fig. 6 is a fragmental perspective view taken along the line 6—6 of Fig. 5 and extended therebelow sufficiently to show two pairs of fixed bars together with the two pairs of diaphragm bars supported by them.
Figure 7:
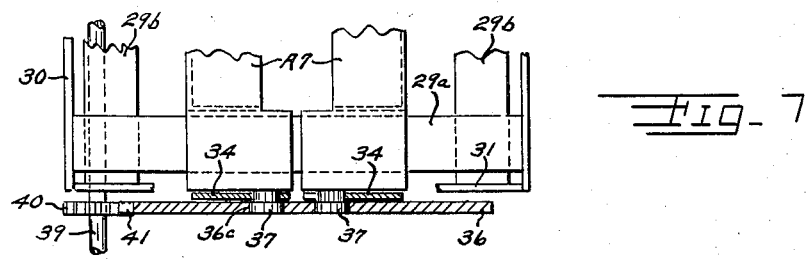
Figs. 7 and 8 are fragmental sectional views taken along similarly numbered lines, respectively, of Fig. 5.
Figure 8:
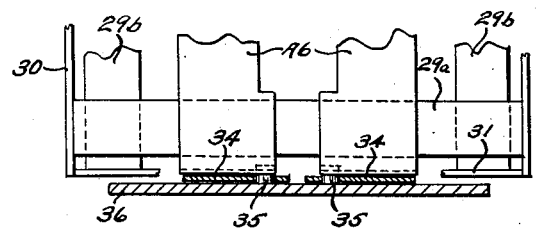

Means is provided for moving each set of diaphragm bars from a minimum cone position shown in dot-dash lines in Fig. 4 to a maximum cone position shown in full lines in Fig. 4. In the present device, the minimum field is indicated as 4 centimeters square and the maximum field as 20 centimeters square. It is obvious that a rectangular field, such as 4 x 20 centimeters, is possible. It is obvious that these dimensions are a matter of choice. The diaphragm bars are made of ray absorbing material, preferably lead or other heavy metal. These diaphragm bars may be encased with a layer of scattered-radiation-minimizing material on all sides if desired, a form being shown here where these bars are so encased on all sides except the inner edge thereof nearest to the high energy rays. In Figs. 4 and 6 this layer of scattered-radiation-minimizing material is indicated at 32 and this is preferably of steel or of material of medium atomic number. In the present disclosure, steel is preferably used for the layer 32 and the strength of this steel is utilized to form a support of the movable diaphragm bars on the fixed bars so as to provide for the lateral adjustment of the diaphragm bars.

As best shown in Figs. 3 and 6, the ends of the layer 32 extend beyond the diaphragm bars A1, A2, etc., B1, B2, etc., as indicated at 32a. These portions 32a lie on opposite sides of the adjacent fixed bar either 29a or 29b as the case may be. A bracket 33 is held in position by the steel portions 32a which are bent over at the end at 42b so as to hold the bracket 33 in place. Each of these brackets embraces one of the fixed bars 29a or 29b so that the supported diaphragm bar slides smoothly along the fixed bar without becoming cocked at an angle.

Figure 5:
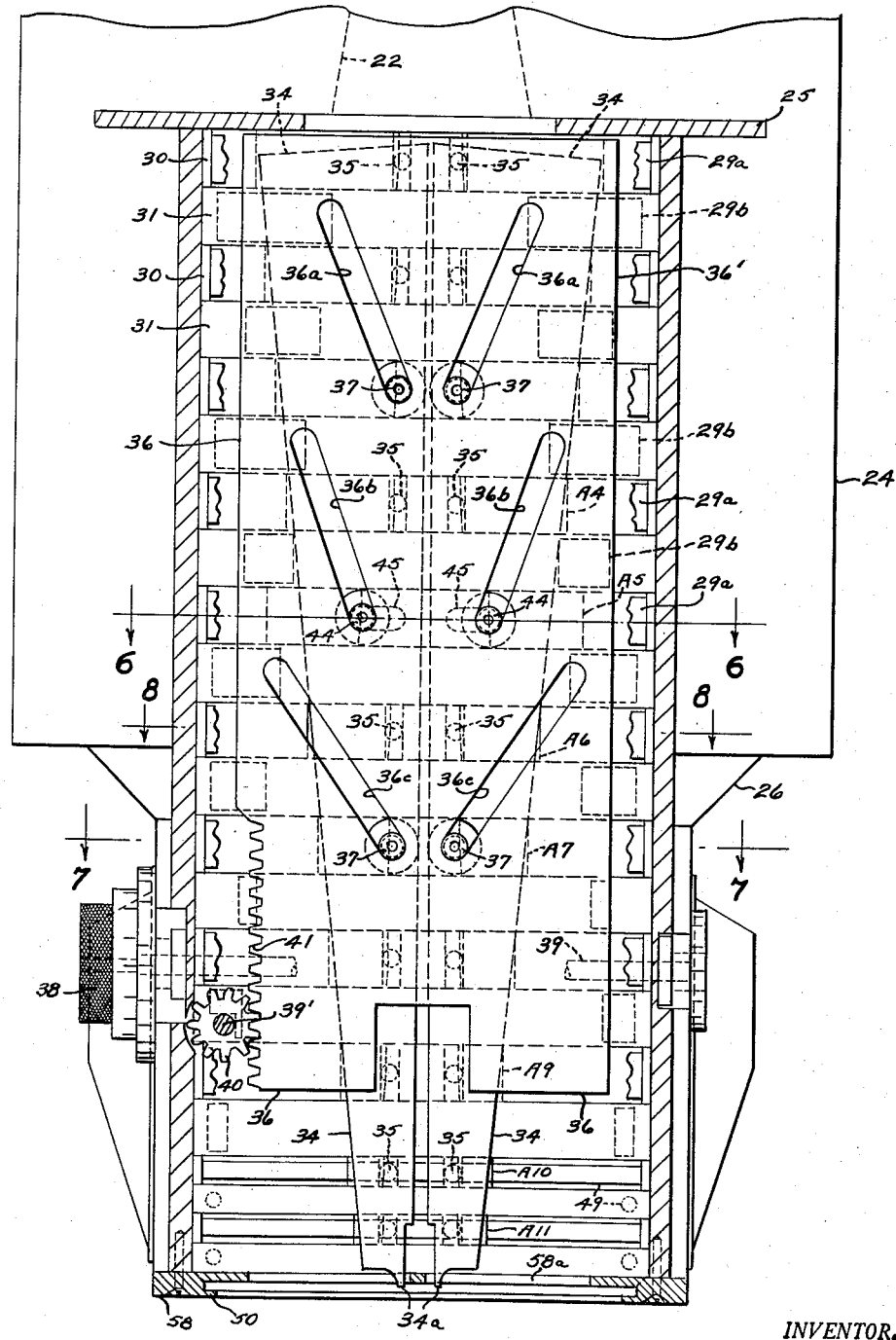
Fig. 5 is a transverse sectional view taken along the line 5—5 of Fig. 3.

One control means is provided for moving the diaphragm bars, indicated with the letter A, toward and away from each other. A second control means is provided for the diaphragm bars indicated by the letter B. These control means are substantially identical and therefore one only will be described. A pair of tie plates 34 are provided at opposite ends of the diaphragm bars A1, A2, etc., there being a pair of these plates 34 at each end of this set of diaphragm bars and the pair of plates 34 at each side lying in a common plane. Each diaphragm bar indicated by the letter A is provided with an outwardly extending pin 35 which extends into the tie plate 34 as seen in Fig. 5. Thus, movement of the tie plates 34, shown in their innermost position in Fig. 5, away from each other will cause the diaphragm bars A to move away from each other from the dot-dash line position of Fig. 4 toward the full line position of Fig. 4, it being understood that any intermediate position is possible. To thus control the movement of the plates 34, cam means is shown comprising cam plates 36, there being a pair of these plates, one outside of the pair of plates 34 at each of the four sides of the collimator. As best seen in Figs. 5 and 6, camming pins 37 are provided at opposite ends of the diaphragm bars A3, A5, and A7. These pins are received in the cam slots 36a, 36b and 36c respectively in the cam plate 36. Special slots 36b for bars A5 or B5 may be omitted if desired. It will be noted in Fig. 5 that the cam slots 36a and 36c are inclined at different angles with respect to the longitudinal axis of the collimator. These cam slots are so arranged that the diaphragm bars A1 to A11 inclusive (except A5) appear to move about the source 19 as an apex. Where the source is other than a point source, as herein described, we prefer to arrange the cam slots 36a and 36c so that the inner edges of the bars A lie along a plane indicated at X in Fig. 4, there being two of these planes on opposite sides of the longitudinal axis of the collimator, each plane X running through one of the lateral edges of the source 19. In like fashion, when the bars A are moved to the maximum field location, the planes Y indicate a position of the inner edges of the diaphragm bars in a plane which again runs through the lateral edges of the source 19. In other words, in any adjusted position of the diaphragm bars, the inner edges thereof lie in inclined planes which pass through the lateral edges of the other-than-point source.

The arrangement of the diaphragm bars B1, B2, etc. is identical with that just described with respect to the A bars but arranged at right angles to the control means just described.

The cam plates 36 on opposite sides of the housing 26 are controlled by a common control knob 38 which is connected with a shaft 39 which carries two spaced pinions 40 which engage racks 41 extending a sufficient length of each of the plates 36 to produce the desired camming action of slots 36a and 36c. Thus the plates 36 on opposite parallel sides of the collimator move in unison lengthwise of the collimator when the hand wheel 38 is turned. It will be noticed that the control knob 38 carries indicia preferably calibrated in terms of the width of the field in centimeters. The plates 36', at right angles to the plates 36, for the control of the diaphragm bars B1, B2, etc., are controlled by knob 38' through shaft 39', pinions 40' and racks 41'. Knob 38' is also calibrated.

It is obvious that rectangular fields are possible 4 centimeters in one dimension and 20 centimeters the other dimension, or any intermediate dimensions. It is also obvious that the square fields of any dimension between 4 centimeters and 20 centimeters on a side are possible.

By rotating the housing 26 in the outer housing 24, a rectangular field may be oriented in any direction desired with respect to the patient.

A circular field may be provided by setting the collimator for a square field and then adding a lead ring at the lower end of the collimator designed to cut off the corners of the square. A split field may be provided, for instance, two 10 x 4 centimeter fields separated by 4 centimeters. This is done by setting the field size to 10 x 12 centimeters and then fixing a strip of lead 4 centimeters wide in the middle of the 12 centimeter dimension.

The inner edges of the diaphragm bars are preferably arranged in two planes as shown in Fig. 4. The planes 42 on the various bars are arranged to approximately coincide with the planes Y when the diaphragm bars are set for the maximum field. The planes 43 are arranged to approximately coincide with the planes X when the diaphragm bars are set for a minimum field.

It will be noticed in Fig. 4 that all of the diaphragm bars and the fixed bars are of extent laterally not greater than the distance from the maximum field setting to the inner confining surfaces of the housing 26. This is one of the features which renders our collimator very compact. It will also be noted that some of the diaphragm bars and fixed bars overlap in every adjusted position of the diaphragm bars. This gives greater control of the high energy rays because the fixed steel bars tend to stop the rays even though not so effectively as the diaphragm bars.

Referring again to Fig. 4, it will be noted that the inner edges of the fixed bars 29b lie approximately in planes diverging away from the source 19. Likewise, the outer edges of the diaphragm bars (except A5) in the dot-dash position for minimum field lie approximately along two planes which converge away from the source. It will be noted that these two planes cross each other approximately at the location of the diaphragm bar A5. It is at this point in the setting for the minimum field that the ray protection is weakest. Therefore in one form of our device we have arranged the diaphragm bars A5 (and B5 at right angles thereto) to give additional protection at this point. Referring back to Fig. 5, it will be noted that the cam slots 36b control pins 44 which in turn move in laterally extending slots 45 in the ends of the bars A5. It results from this construction, that the bars A5, and B5, in the setting for maximum field are aligned along the planes YY. However, when setting for any field where the plane X lies inwardly from the inner edge of the bar A5 as shown in dot-dash lines in Fig. 4, the bar A5 moves no further inwardly but remains in the dot-dash line position of Fig. 4 so as to block radiation at that point.

If desired, additional protection against scattered and primary radiation may be provided by the lead ring 46 which is inset into the inner face of the housing 26 at a point removed from the source end thereof. It will be noted in Fig. 4 that a line W extending from one side of the source 19 past the corner 47 of the outer mouth of aperture 22 will strike the lead ring 46, and preferably the lead ring extends at least this close to the source end of the collimator.

If desired, a ring 48 may be rotatably mounted on the outer face of housing 24 for carrying beam directing devices.

If desired, round fixed bars as indicated at 49 may be arranged at the outer end of the collimator partly for strength and partly for the support of the movable diaphragm bars at that end of the collimator.

A lip is provided as indicated at 50 on one side of collar 58 for the reception of a flange 51a of a compression applicator 51. On the opposite side of collar 58 is a catch 59, pivotally mounted at 60 and held by a spring (not shown) in the full line position against stop 61. Movement of the catch to the dot-dash position of Fig. 9 permits flange 51a to fit into place, after which release of the catch holds it there. Preferably, a plurality of such applicators are provided for use with our improved collimator, and each applicator will be provided with spaced notches 52 along the outer edge of flange 51a to receive the projecting ends 34a of tie plates 34. These devices are so arranged that the compression applicator can be properly positioned only when the projections 34a fit in the slots 52. Since the position of the projections 34a varies with the setting of the field, this insures that the proper size applicator is used for each field setting.

It will be noticed in Fig. 3 that the maximum dimension of the lower end of the collimator is of about the same size as the maximum field size obtainable. This is because the fixed bars and diaphragm bars at the lower end of the collimator are very thin in a lateral dimension. The actual size of the end of the collimator here described is approximately 8½ inches square with rounded corners.

Examination shows that the poorest protection is provided approximately along the planes YY. To estimate the protection in this direction, it is necessary to divide the source into a number of equal areas and estimate the protection from each, and then average. This has been done for a number of directions and shows that with lead bars A1 through A9 of 1 inch thick and bars A10 and A11 ½ inch thick, of lead, the amount of radiation which emerges is less than 0.2 percent of the main beam for all positions, and less than 0.1 percent for most of the points in space at the end of the collimator. This protection is much better than has been achieved before with penetrating radiation, to the best of our knowledge.

If desired, light from an optical system 53 may be reflected down the axis of the machine by a thin mirror 54 to outline the field size in the standard way.

Also, if desired, distance localizers may be provided on opposite sides of the end of the collimator as shown in Fig. 4. The distance localizer consists of two light bulbs 55 having V-shape filaments focused through lens 56 and mirrors 57 so that the V filaments have their apexes touching each other at the skin position when the skin is 80 centimeters from the source 19. This setting is very sensitive and motion of the skin surface of two to three millimeters is readily observed.

Wherever in the claims we refer to "a cone of rays," it will be understood that a pyramid or truncated pyramid of rays is meant.

What we claim is:

1. A collimator for high energy rays emanating from a source, comprising a housing adapted for attachment to a source of said rays, a plurality of three or more layers of ray absorbing diaphragms movably mounted in said housing and said layers arranged progressively from the source end thereof outwardly to define an enclosed rectangular aperture for the rays, the diaphragms in each of said layers being adjustable in two directions at right angles to each other to provide square and elongated rectangular apertures as desired, and control means operatively connected with said diaphragms, said connections holding the inner edges of said diaphragms nearest said rays in progressively diverging relation in a direction away from said source in a plurality of adjusted positions thereof, the inner edges of a plurality of said diaphragms lying along the slanting sides of an imaginary cone, the sides of which extend through said source.

2. The combination of claim 1 wherein there are two sets of pairs of said diaphragms, the pairs of one set being generally parallel and spaced laterally half on each side of the central axis of the rays, and the pairs of the other set being generally parallel to each other and at right angles to the diaphragms of the first set, the pairs of said other set being spaced laterally half on each side of the central axis of the rays.

3. The combination of claim 2 wherein said diaphragms are bars having a lateral width less than the distance from the outer edge of the largest cone of rays to said housing.

4. The combination of claim 3 including sets of fixed bars interleaved between said movable bars, said fixed bars having a lateral width not greater than the distance from the outer edge of the largest cone of rays to said housing.

5. The combination of claim 4 wherein at least some of said fixed bars overlap some of said movable bars when the latter are set for the smallest cone of rays.

6. The combination of claim 1 including a layer of scattered-radiation-minimizing material covering the outer sides of said diaphragms.

7. The combination of claim 1 wherein said control means holds the inner edges of a plurality of said diaphragms substantially aligned along the slanting sides of an imaginary cone whose apex is approximately at said source.

8. In combination, a source of high energy rays completely encased in ray-protective material save for a single generally conical recess in said material diverging outwardly away from said source, said recess having a mouth, a housing surrounding said mouth and having a ray-tight connection therewith, said housing having a hollow communicating with and substantially coaxial with said recess, a plurality of three or more layers of ray absorbing diaphragms movably mounted in said housing and said layers arranged progressively from the source end thereof outwardly to define an adjustable enclosed aperture for the rays, the diaphragms in each of said layers being adjustable independently in two directions at right angles to each other, and control means operatively connected with said diaphragms, said connections holding the inner edges of said diaphragms nearest said rays in progressively diverging relation in a direction away from said source in a plurality of adjusted positions thereof, the inner edges of a plurality of said diaphragms lying along the slanting sides of an imaginary cone, the sides of which extend through said source.

9. The combination of claim 8 wherein diaphragms near said source end of said housing extend inwardly to overlap the edges of said mouth.

10. In combination, an other-than-point source of high energy rays, a holder therefor, a housing secured to said holder, a plurality of three or more layers of ray absorbing diaphragms movably mounted in said housing and arranged progressively from the source end thereof outwardly, and control means operatively connected with said diaphragms, said connections holding the inner edges of said diaphragms nearest said rays in progressively diverging relation in a direction away from said source, said control means holding at least three or more layers of said diaphragms in various adjusted positions, and in each said position with the inner edges of a plurality of said diaphragms substantially aligned along the slanting sides of an imaginary cone, the sides of which extend approximately through the lateral edges of said source.

11. The combination of claim 10 wherein said diaphragms progressively decrease in lateral width from said source outwardly.

12. The combination of claim 10 wherein said diaphragms are provided with a covering layer of secondary-radiation-minimizing material on substantially all sides thereof.

13. A collimator for high energy rays emanating from a source comprising a housing adapted for attachment to a source of said rays, first and second sets of fixed bars secured to said housing, each said set comprising pairs of bars lying one along each side of the opposite parallel sides of a rectangle, one of said sets of bars lying at right angles to said other set, each of said pairs of bars lying generally in the same plane, said pairs of said first set being arranged alternately between said pairs of said second set, pairs of diaphragm bars of ray absorbing material supported by and slidable laterally upon said fixed bars, said diaphragm bars being arranged in two sets including a first set at right angles to a second set, said fixed bars and diaphragm bars forming ray-absorbing diaphragms, and control means operatively connected with said diaphragm bars, said connections holding the inner edges of said diaphragm bars of each set independently of the other set in progressively diverging relation in a direction away from said source, in a plurality of adjusted positions of said diaphragm bars.

14. The combination of claim 13 wherein said control means comprises tie plates operatively connected with one of said sets of diaphragm bars, and cam means for holding said tie plates in various adjusted positions.

15. The combination of claim 13 wherein said control means comprises first and second pairs of tie plates operatively connected with said first and second sets of diaphragm bars respectively, and cam means for holding each pair of tie plates in various adjusted positions.

16. The combination of claim 15 wherein separate cam means is provided holding said first and second pairs of tie plates.

17. The combination of claim 14 wherein the lateral width of said fixed bars and of said diaphragm bars decreases progressively away from said source.

18. The combination of claim 17 wherein the laterally innermost edges of said fixed bars on opposite sides of said collimator lie generally in planes diverging away from said source and the laterally outermost edges of said diaphragm bars on the same opposite sides lie generally in planes converging away from said source when said diaphragm bars are in their innermost adjusted position.

19. The combination of claim 18 including a pair of movably mounted diaphragm bars approximately where said diverging and converging planes cross, and said control means connected with said last named pair of bars to hold them there when said diaphragm bars are in their innermost adjusted position and to move said last named pair of bars laterally outwardly when said diaphragm bars are in their outermost adjusted position.

20. The combination of claim 13 including fixed means for attachment to said source, and said housing being rotatably mounted in said fixed means.

21. The combination of claim 1 including means for attaching compression applicators at the end of said housing removed from said source, together with interlocking means between an applicator and said control means compelling the use of an applicator of the proper size.

22. The combination of claim 13 wherein said control means comprises first and second pairs of tie plates operatively connected with said first and second sets of diaphragm bars respectively, cam means for holding each pair of tie plates in variously adjusted positions, means for attaching a compression applicator at the end of said housing removed from said source, and interlocking means between said tie plates and said attaching means insuring the attachment of an applicator of a predetermined size for a predetermined setting of said tie plates.

References Cited in the file of this patent

UNITED STATES PATENTS

| | | |
|---|---|---|
| 1,909,118 | Raab | May 16, 1933 |
| 2,542,196 | Haupt | Feb. 20, 1951 |
| 2,675,486 | Green et al. | Apr. 13, 1954 |